(12) United States Patent
Sato et al.

(10) Patent No.: US 10,914,906 B2
(45) Date of Patent: Feb. 9, 2021

(54) OPTICAL FIBER CABLE

(71) Applicant: SUMITOMO ELECTRIC INDUSTRIES, LTD., Osaka (JP)

(72) Inventors: Fumiaki Sato, Osaka (JP); Kenta Tsuchiya, Osaka (JP); Kuushin Ryan, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/962,053

(22) PCT Filed: Jan. 17, 2019

(86) PCT No.: PCT/JP2019/001173
§ 371 (c)(1),
(2) Date: Jul. 14, 2020

(87) PCT Pub. No.: WO2019/142841
PCT Pub. Date: Jul. 25, 2019

(65) Prior Publication Data
US 2020/0409005 A1 Dec. 31, 2020

(30) Foreign Application Priority Data
Jan. 18, 2018 (JP) .................................. 2018-006300

(51) Int. Cl.
*G02B 6/44* (2006.01)
(52) U.S. Cl.
CPC .......... *G02B 6/4409* (2013.01); *G02B 6/4405* (2013.01); *G02B 6/4407* (2013.01); *G02B 6/4404* (2013.01)

(58) Field of Classification Search
None
See application file for complete search history.

(56) References Cited

U.S. PATENT DOCUMENTS 4,767,484 A * 8/1988 Schott .................. G01L 1/2287
156/233
4,814,133 A * 3/1989 Kitagawa ............. G02B 6/4407
264/1.28

(Continued)

FOREIGN PATENT DOCUMENTS

DE 4408548 A1 * 12/1995
EP 0 996 016 A2 4/2000

(Continued)

*Primary Examiner* — Michael Stahl
(74) *Attorney, Agent, or Firm* — Faegre Drinker Biddle & Reath LLP

(57) ABSTRACT

An optical fiber cable having a slot core which includes a plurality of ribs formed along a cable longitudinal direction and in which slot grooves for housing optical fibers are formed between the ribs. The optical fiber cable includes: subunits each of which is formed by bundling a plurality of intermittent-connection-type optical fiber ribbons in which a connection part where adjacent optical fibers are connected to each other and a non-connection part where adjacent optical fibers are not connected to each other are intermittently provided in the longitudinal direction among some or all of optical fibers; and a thin-skin-shaped tube having Young's modulus lower than Young's modulus of a material forming the slot core. The subunits are housed in the slot grooves, and among the subunits in the slot grooves, at least a subunit located at an outer peripheral part of the slot grooves is covered with the tube.

6 Claims, 4 Drawing Sheets

(56) References Cited

U.S. PATENT DOCUMENTS

| | | | | |
|---|---|---|---|---|
| 4,906,067 A | * | 3/1990 | Mayr | G02B 6/441 385/112 |
| 5,155,789 A | * | 10/1992 | Le Noane | G02B 6/441 385/102 |
| 5,649,043 A | * | 7/1997 | Adams | G02B 6/4413 385/110 |
| 2005/0031275 A1 | * | 2/2005 | Ishii | G02B 6/4489 385/100 |
| 2011/0091171 A1 | * | 4/2011 | Tatat | G02B 6/4433 385/105 |
| 2011/0110635 A1 | | 5/2011 | Toge et al. | |
| 2016/0223769 A1 | * | 8/2016 | Ito | G02B 6/4413 |
| 2018/0348464 A1 | | 12/2018 | Sato et al. | |
| 2019/0265425 A1 | * | 8/2019 | Stover | G02B 6/4494 |
| 2020/0064550 A1 | * | 2/2020 | Sato | G02B 6/262 |
| 2020/0183111 A1 | * | 6/2020 | Sato | G02B 6/4403 |

FOREIGN PATENT DOCUMENTS

| | | | |
|---|---|---|---|
| EP | 3470900 A1 | | 4/2019 |
| JP | 8-262294 A | * | 10/1996 |
| JP | 2003-195129 A | | 7/2003 |
| JP | 2011-8923 A | | 1/2010 |
| JP | 2014-071441 A | | 4/2014 |
| JP | 2015-099314 A | | 5/2015 |
| JP | 2015-99315 A | | 5/2015 |
| JP | 2015-517679 A | | 6/2015 |
| JP | 2017-134267 A | | 8/2017 |
| JP | 2017-223730 A | | 12/2017 |
| WO | WO-2013/165407 A1 | | 11/2013 |

\* cited by examiner

OPTICAL FIBER CABLE

TECHNICAL FIELD

The present disclosure relates to an optical fiber cable.

The present application claims the benefit of priority of Japanese Patent Application No. 2018-006300, filed on Jan. 18, 2018, the content of which is incorporated herein by reference.

BACKGROUND ART

Patent Literature 1 describes an optical fiber cable including an optical fiber ribbon in a pipe.

Patent Literature 2 describes an optical fiber unit in which a plurality of optical fibers are bundled.

Patent Literature 3 describes an optical fiber cable including: a slot core in which a slot groove for housing an optical fiber is formed on an outer peripheral surface along a cable longitudinal direction; a press winding tape that is wound around the entire outer peripheral surface of the slot core to cover the slot groove; and a sheath that covers the press winding tape and the slot core.

CITATION LIST

Patent Literature

Patent Literature 1: JP-T-2015-517679
Patent Literature 2: JP-A-2010-8923
Patent Literature 3: JP-A-2014-71441

SUMMARY OF INVENTION

An optical fiber cable according to one embodiment of the present disclosure is an optical fiber having a slot core which includes a plurality of ribs formed along a cable longitudinal direction and in which slot grooves for housing optical fibers are formed between the ribs, the optical fiber cable including:

subunits each of which is formed by bundling a plurality of intermittent-connection-type optical fiber ribbons in which a connection part where adjacent optical fibers are connected to each other and a non-connection part where adjacent optical fibers are not connected to each other are intermittently provided in the longitudinal direction among some or all of optical fibers; and a thin-skin-shaped tube having Young's modulus lower than Young's modulus of a material forming the slot core.

The subunits are housed in the slot grooves, and among the subunits in the slot grooves, at least a subunit located at an outer peripheral part of the slot grooves is covered with the tube.

DESCRIPTION OF EMBODIMENTS

Technical Problem

Figure 1:
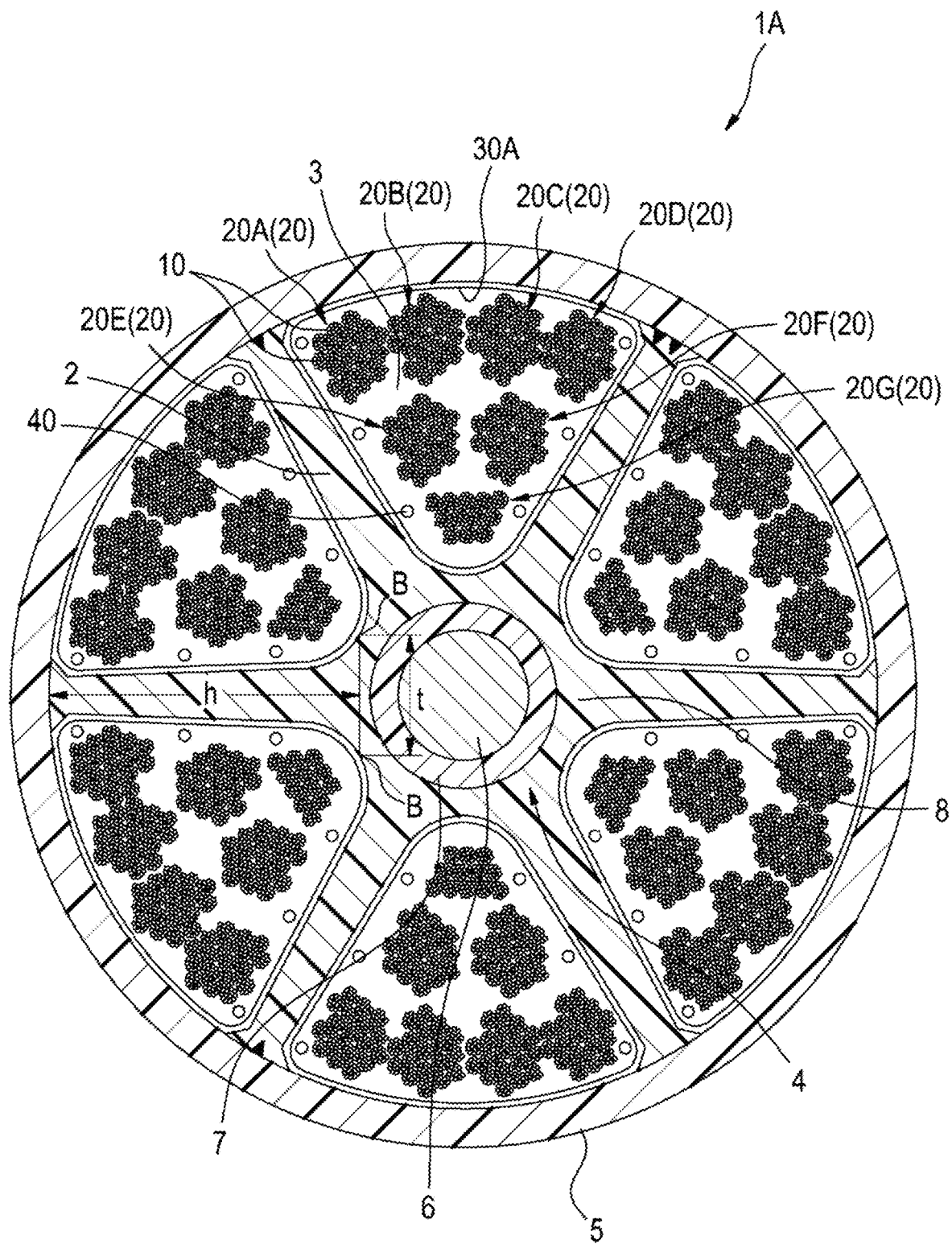
FIG. 1 is a cross-sectional view illustrating a configuration of an optical fiber cable according to a first embodiment of the present disclosure.

In a slot type cable, a rough winding or a press winding such as a water absorbing tape is applied to an outer periphery of a slot groove. When tension of the press winding is applied to a slot core and the slot core is wound, the cable is deformed into a polygonal shape so that a space in which an optical fiber is housed is formed inside a straight line connecting rib apexes of a slot. Therefore, the space in which the optical fiber can be housed is restricted. As a result, an optical fiber cable is restricted from achieving multi-coaxiality and high-density.

An object of the present disclosure is to provide a multi-coaxial and high-density optical fiber cable.

Advantageous Effects of the Present Disclosure

According to the present disclosure, it is possible to provide a multi-coaxial and high-density optical fiber cable.

Description of Embodiments of the Present Disclosure

First, embodiments of the present disclosure will be listed and described.

(1) An optical fiber cable according to one embodiment of the present disclosure is an optical fiber cable having a slot core which includes a plurality of ribs formed along a cable longitudinal direction and in which slot grooves for housing optical fibers are formed between the ribs, the optical fiber cable including:

subunits each of which is formed by bundling a plurality of intermittent-connection-type optical fiber ribbons in which a connection part where adjacent optical fibers are connected to each other and a non-connection part where adjacent optical fibers are not connected to each other are intermittently provided in the longitudinal direction among some or all of optical fibers; and a thin-skin-shaped tube having Young's modulus lower than Young's modulus of a material forming the slot core.

The subunits are housed in the slot grooves, and among the subunits in the slot grooves, at least a subunit located at an outer peripheral part of the slot grooves is covered with the tube.

According to the above-described configuration, since the subunit located at the outer peripheral part of the slot groove is covered with the thin-skin-shaped tube having Young's modulus lower than that of the material forming the slot core, a rough winding or a press winding such as a water absorbing tape may not be applied to the outer periphery of the slot groove. Therefore, since there is no deformation of the cable by applying the rough winding or the press winding thereto, there is no restriction on an optical fiber housing space due to the deformation, thereby making it possible to provide a multi-coaxial and high-density optical fiber cable.

(2) The number of cores of the optical fibers housed in one of the slot grooves may be equal to or greater than 288 cores.

According to the above-described configuration, it is possible to provide a multi-coaxial optical fiber cable in which the number of cores of the optical fibers housed in one of the slot grooves is equal to or greater than 288 cores.

(3) When a length of a root part of the rib, which is defined by a line connecting bottom parts of the slot grooves, is defined as t and a distance of a straight line connecting the root part and an apex of the rib is defined as a rib height h, h/t is equal to or greater than 4 and equal to or less than 8.

According to the above-described configuration, the rib becomes thin as the h/t is equal to or greater than 4, thereby making it possible to house a larger number of optical fibers in the slot groove. Since the h/t is equal to or less than 8, strength of the rib can be secured to some extent and thus the rib is hard to be deformed.

(4) At least an outermost layer portion of the slot core may be formed of engineering plastic.

According to the above-described configuration, since at least the outermost layer portion of the slot core is formed of the engineering plastic which is relatively hard material, strength of the slot core can be improved.

(5) A water absorbing yarn may be provided in the tube.

According to the above-described configuration, since the water absorbing yarn is provided in the tube, a waterproof function can be added to the tube.

(6) Core density of optical fibers housed in the optical fiber cable may be equal to or greater than 5.0 cores/mm².

According to the above-described configuration, it is possible to provide a high-density optical fiber cable whose core density is equal to or greater than 5.0 cores/mm².

Details of Embodiments of the Present Disclosure

A specific example of an optical fiber cable according to embodiments of the present disclosure will be described hereinafter with reference to the drawings.

The present invention is not limited to these embodiments, and is indicated by the scope of claims. The present invention is intended to include meanings equivalent to the scope of claims and all modifications within the scope.

First Embodiment

FIG. 1 is a cross-sectional view perpendicular to a length direction of an optical fiber cable according to a first embodiment of the present disclosure. As illustrated in FIG. 1, an optical fiber cable 1A of the first embodiment is a slot type cable including a slot core 4 provided with a plurality of (6 pieces in this example) ribs 2 and slot grooves 3 between the ribs 2. The rib 2 and the slot groove 3 are formed in, for example, a spiral shape or an SZ shape along a longitudinal direction (the length direction) of the optical fiber cable 1A.

A subunit 20 formed by bundling a plurality of optical fiber ribbons 10 is housed in the slot groove 3 along the longitudinal direction of the optical fiber cable 1A. Here, for example, 7 pieces of the subunits 20 (20A to 20G) are housed in one slot groove 3. Here, for example, 18 pieces of the optical fiber ribbons 10 are bundled in one subunit.

18 pieces of the optical fiber ribbons 10 forming the respective subunits 20A to 20G are stranded with each other and assembled. For example, a bundle material (not illustrated) may be wound around the respective subunits 20A to 20G so that the stranded optical fiber ribbons 10 are not disassembled into pieces. The bundle material may be a bundle material having an identifiable color. For example, 7 pieces of the subunits 20 (20A to 20G) may be spirally wound with a roughly wound yarn (not illustrated) as a whole to form one assembly.

An outer periphery of 7 pieces of all the subunits 20A to 20G housed in the respective slot grooves 3 is covered with a thin-skin-shaped tube 30A. A thickness of the tube 30A is about 0.3 mm. For example, the tube 30A is formed of a plastic resin such as low-density polyethylene (PE) and polyvinyl chloride (PVC). For example, Young's modulus of the resin forming the tube 30A is lower than Young's modulus of a material forming the slot core 4. The tube 30A can be easy to be elastically deformed. The material of the slot core 4 will be described later.

In order to easily take out the internal subunits 20A to 20G, for example, an opening part (not illustrated) may be formed in the tube 30A by cutting off a part in a circumferential direction. For example, the opening part is formed in a spiral shape along the longitudinal direction of the subunit 20.

A water absorbing yarn 40 having a waterproof function may be provided in the tube 30A. The water absorbing yarn 40 is, for example, a linear member having an outer diameter of about 0.1 mm in a dry state, and is provided along the longitudinal direction of the optical fiber cable 1A.

A sheath 5 is provided at an outer periphery of the slot core 4 to cover the slot groove 3. The sheath 5 is formed of, for example, a resin such as polyethylene (PE). The sheath 5 is formed around the slot core 4 by extrusion-molding the resin. The sheath 5 is provided in a state of directly contacting the tube 30A that covers the subunits 20A to 20G.

A tension member 6 formed of a steel wire is embedded in a center part of the slot core 4 along the longitudinal direction of the optical fiber cable 1A.

The slot core 4 is formed as a two-layer structure including a first layer part 7 provided at an outer periphery of the tension member 6 and a second layer part 8 (an example of an outermost layer portion) provided at an outer periphery of the first layer part 7. The first layer part 7 is provided as an adhesive layer that bonds the tension member 6 and the second layer part 8. For example, the first layer part 7 is formed of a resin having the relatively low Young's modulus such as ethylene-methacrylic acid copolymer. The second layer part 8 is a layer that forms a portion outside the first layer part 7, and the rib 2 is also included in the second layer part 8. For example, the second layer part 8 is formed of engineering plastic having the relatively high Young's modulus such as polybutylene terephthalate (PBT).

In order to increase the number of cores of the optical fibers housed in the optical fiber cable 1A, for example, it is desirable that the number of ribs 2 forming the slot core 4 is small, that is, the number of slot grooves 3 is small. Therefore, in the optical fiber cable 1A, the number of slot grooves 3 in the slot core 4 is set to be equal to or less than 6.

In order to achieve the high-density in the same manner, it is desirable that a volume occupied by the rib 2 in the slot core 4 is small, that is, a thickness (fatness) of each rib 2 is slim (thin). Therefore, in the optical fiber cable 1A, as illustrated in FIG. 1, when a length of a root part of the rib 2 defined by a line connecting bottom parts of the adjacent slot grooves 3 is defined as t, and a distance connecting a straight line from the root part to an apex of the rib 2 is defined as a height h of the rib 2, h/t is set to be equal to or greater than 4 and equal to or less than 8. Here, the bottom part of the slot groove 3 indicates a bottom point B closest to a center point X of the slot core 4 in the slot groove 3 having a round-shaped bottom as illustrated in FIG. 1.

The rib 2 becomes thin as the above-described h/t is equal to or greater than 4, whereby more optical fibers can be housed in the slot groove 3. Since the h/t is equal to or less than 8, strength of the rib can be secured to some extent, and the rib is hard to be deformed. In the optical fiber cable 1A, the second layer part 8 of the slot core 4 is formed of the engineering plastic having high Young's modulus as described above.

Figure 2:
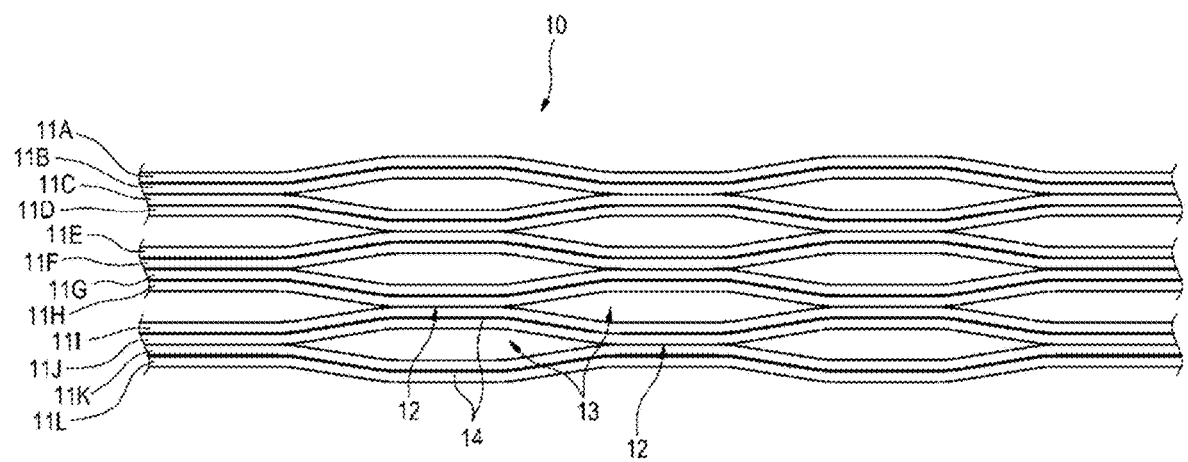
FIG. 2 is a diagram illustrating an example of an optical fiber ribbon housed in the optical fiber cable.

FIG. 2 illustrates an example of the optical fiber ribbon 10 forming the subunit 20. As illustrated in FIG. 2, the optical fiber ribbon 10 is an intermittent-connection-type optical fiber ribbon in which a connection part 12 where the adjacent optical fibers are connected to each other and a non-connection part 13 where the adjacent optical fibers are not connected to each other are intermittently provided in the longitudinal direction in a state where the plurality of optical fibers 11A to 11L are arranged in parallel.

In the optical fiber ribbon 10 of this example, 12 pieces of the optical fibers 11A to 11L are arranged in parallel. FIG. 2 illustrates the intermittent-connection-type optical fiber ribbon in which the optical fibers 11A to 11L are in a state of being opened in an arrangement direction. A place where the connection part 12 and the non-connection part 13 are intermittently provided may exist between some parts of the optical fibers as illustrated in FIG. 2 or may exist between all the optical fibers. In the example illustrated in FIG. 2, the non-connection part 13 is not provided between respective lines of the optical fibers 11A and 11B, 11C and 11D, 11E and 11F, 11G and 11H, 11I and 11J, and 11K and 11L.

The connection part 12 in the optical fiber ribbon 10 is formed by applying a connection resin 14 formed of, for example, an ultraviolet curing resin and a thermosetting resin between the optical fibers. The connection resin 14 is intermittently applied between the predetermined optical fibers, whereby the connection part 12 and the non-connection part 13 are intermittently provided, and the respective optical fibers 11A to 11L are integrated in a parallel state. The connection resin 14 may be applied to only one side of a parallel surface to be formed by the optical fibers 11A to 11L arranged in parallel, or may be applied to both sides thereof. The optical fiber ribbon 10 may be manufactured in such a manner that, for example, a tape resin is applied to one side or the whole of both sides of the optical fibers 11A to 11L arranged in parallel and all the optical fibers 11A to 11L are connected to each other, after which the non-connection part 13 is formed by cleaving a part with a rotary blade.

The optical fibers 11A to 11L are formed with, for example, a glass fiber formed of a core and a clad, and a coating layer for coating the glass fiber. For example, the coating layers of the optical fibers 11A to 11L are colored in respectively different colors so that the optical fibers can be discriminated from each other. An outer diameter of the optical fibers 11A to 11L is desirably equal to or less than 0.2 mm. When the outer diameter of the fiber having a small diameter is equal to or less than 0.2 mm, the high-density can be achieved.

It is desirable that the number of cores of the optical fibers housed in one of the slot grooves 3 is equal to or greater than 288 cores, and it is desirable that the core density of the optical fibers housed in the optical fiber cable 1A is equal to or greater than 5.0 cores/mm$^2$.

Specifically, for example, in the optical fiber cable 1A illustrated in FIG. 1, the slot groove 3 houses 6 pieces of the subunits 20 in which 18 pieces of the optical fiber ribbons 10 including 12 cores are assembled and 1 piece of the subunit 20 in which 12 pieces of the optical fiber ribbons 10 having 12 cores are assembled. Therefore, the total number of optical fibers is 1440 cores (12×18×6+12×12×1). Since the slot core 4 is formed with 6 pieces of the slot grooves 3, the total number of optical fibers housed in the optical fiber cable 1A is 8640 cores (1440×6). Since an outer diameter of the optical fiber cable 1A is 37 mm, its cross-sectional area is 1075 mm$^2$. Therefore, the core density of the optical fibers in the optical fiber cable 1A is 8.0 cores/mm$^2$ (8640/1075), which becomes equal to or greater than 5.0 cores/mm$^2$.

Figure 4:
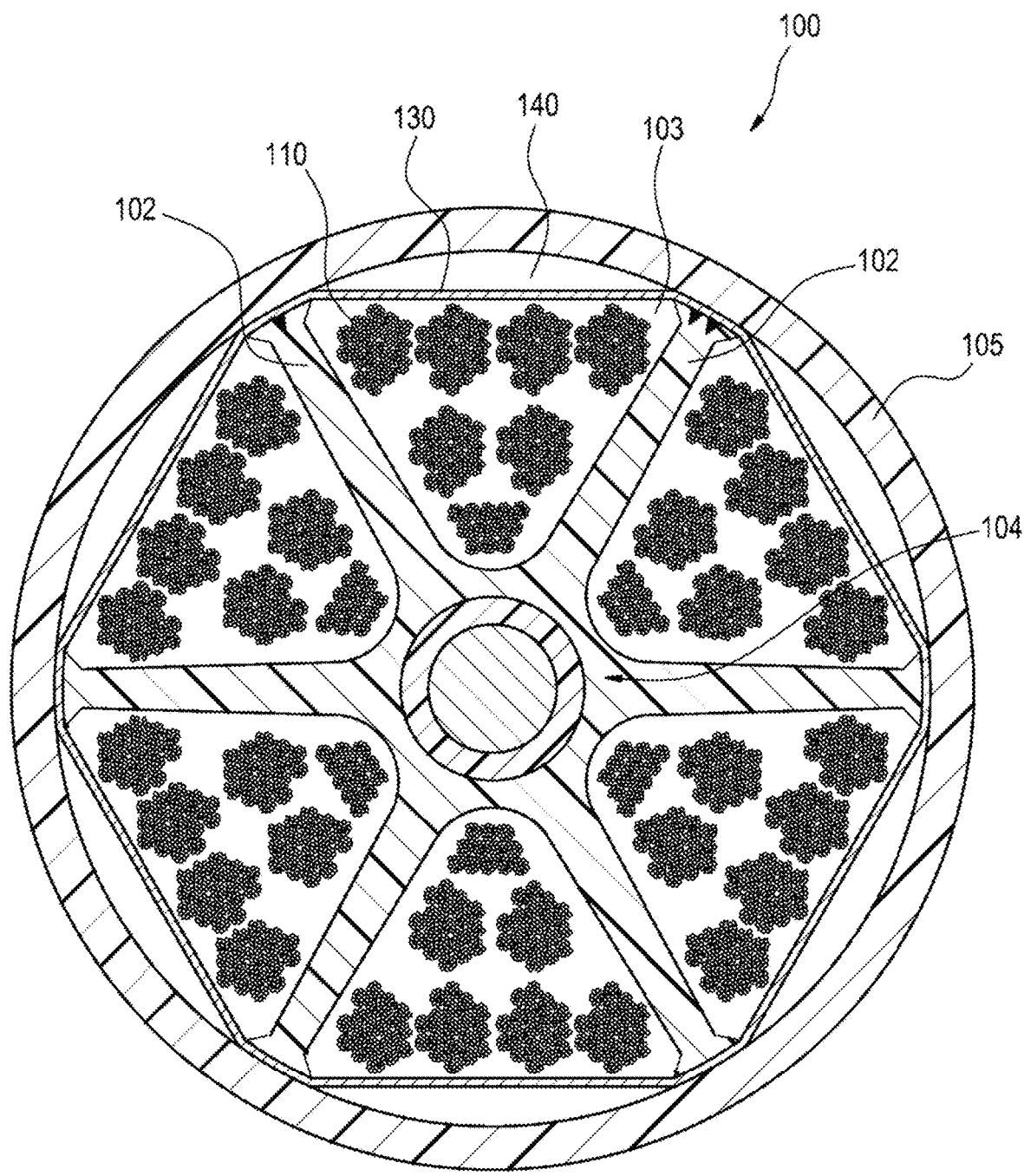
FIG. 4 is a cross-sectional view illustrating a comparative example of the configuration of the optical fiber cable.

Meanwhile, in a slot type cable 100 of a comparative example illustrated in FIG. 4, a rough winding or a press winding 130 such as a water absorbing tape is applied to an outer periphery of a slot core 104 to cover a slot groove 103. The slot core 104 has the same structure as that of the slot core 4 of the first embodiment.

Since the press winding 130 is wound by applying tension to the outer periphery of the slot core 104, a polygonal shape that connects apexes of ribs 102 is formed. Therefore, a space 140 between a sheath 105 having a circular cross section and the press winding 130 having the polygonal shape cannot be used as a housing space for an optical fiber 110. When the sheath 105 is actually formed by extrusion molding, the space 140 in FIG. 4 is crushed, such that an outer shape of the slot type cable 100 becomes the polygonal shape without the space 140 in FIG. 4.

Therefore, in the slot type cable 100 of the comparative example, a space in the slot groove 103 in which the optical fiber 110 can be housed is provided inside a line connecting the apexes of the ribs 102 (the press winding 130). As a result, the optical fiber 110 is restricted from achieving multi-coaxiality and high-density.

According to the optical fiber cable 1A of the first embodiment in comparison with the comparative example, all the subunits 20A to 20G housed in the slot groove 3 are covered with the thin-skin-shaped tube 30A. Therefore, since the subunits 20A to 20G housed in the slot groove 3 and the optical fiber ribbons 10 forming the subunits 20A to 20G are not disassembled into pieces and thus do not protrude from the slot groove 3, the press winding may not be applied to the outer periphery of the slot groove 3. Therefore, there is no restriction on the housing space of the slot groove 3 due to the application of the press winding, thereby making it possible to effectively utilize the housing space of the slot groove 3 to the maximum without waste. Accordingly, a large number of optical fiber ribbons 10 can be housed in the slot groove 3, thereby making it possible to provide a multi-coaxial and high-density optical fiber cable.

Since a material having Young's modulus lower than that of the material forming the slot core 4 is used as the-thin-skin-shaped tube 30A, the tube 30A covering the subunits 20A to 20G can be elastically deformed corresponding to a shape of the housing space of the slot groove 3. Therefore, the housing space of the slot groove 3 can be further utilized without waste.

Since at least the second layer part 8 which is the outermost layer portion of the slot core 4 is formed of the engineering plastic which is a relatively hard material, strength of the slot core 4 can be improved. Therefore, the ratio h/t of the height h of the rib 2 to the length t of the root part of the rib 2 can be set to be equal to or greater than 4, whereby the rib 2 can be made thinner and thus more large number of optical fiber ribbons 10 can be housed in the slot grooves 3.

Since the water absorbing yarn 40 is provided in the tube 30A, a waterproof function can be added to the tube 30A.

Second Embodiment

An optical fiber cable according to a second embodiment of the present disclosure will be described with reference to FIG. 3. The same configurations as those of the optical fiber cable 1A according to the first embodiment will be denoted by the same reference signs, and the description thereof will be omitted.

Figure 3:
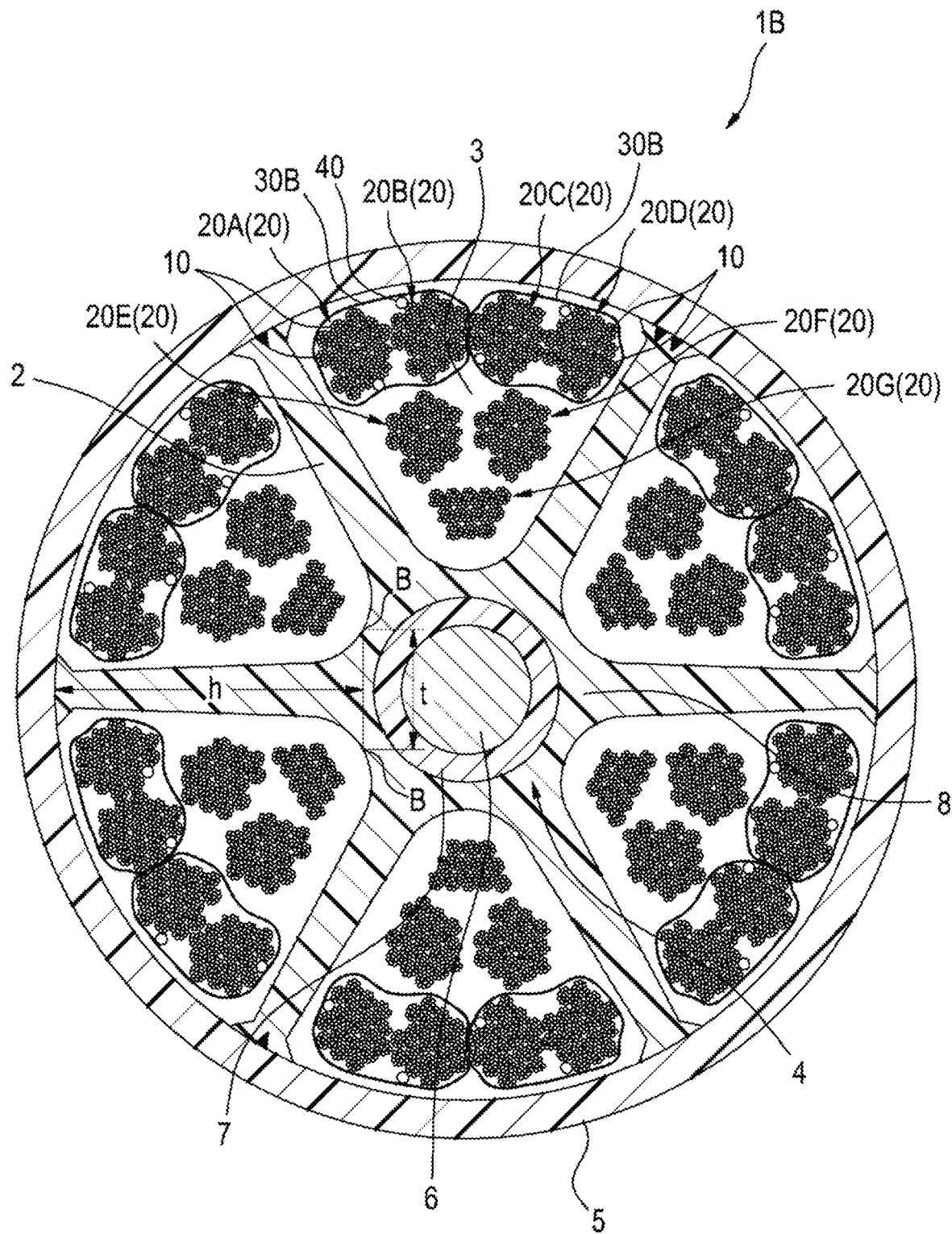
FIG. 3 is a cross-sectional view illustrating a configuration of an optical fiber cable according to a second embodiment of the present disclosure.

FIG. 3 is a cross-sectional view perpendicular to a length direction of an optical fiber cable 1B according to the second embodiment. The optical fiber cable 1B is the same as the first embodiment in that among the subunits 20A to 20G in the slot groove 3, the subunit 20 located at an outer peripheral part of the slot groove 3 (position in contact with the sheath 5) is covered with the tube, but is different from the optical fiber cable 1A of the first embodiment in which all the subunits 20A to 20G are covered in that only the subunit 20 located at the outer peripheral part of the slot groove 3 is covered with the tube 30B.

As illustrated in FIG. 3, in this example, among the subunits 20A to 20G, the subunits 20A to 20D located at the outer peripheral part of the slot groove 3 are covered with the tube 30B. Here, among the subunits 20A to 20D located at the outer peripheral part of the slot groove 3, the subunits 20A and 20B are covered with one tube 30B, and the subunits 20C and 20D are covered with another tube 30B. Since the subunits 20A to 20G housed in the slot groove 3 are not stranded back, the subunits 20A to 20D covered with the tube 30B are formed to be necessarily located (existing) at the outer peripheral part of the slot groove 3.

The number of subunits 20 covered with the tube 30B may be single or plural. For example, the subunits 20A to 20D may be covered with the respective tubes 30B, or 4 pieces of the subunits 20A to 20D may be covered with one tube 30B. The subunits may be divided into one subunit 20 and three subunits 20 and respectively covered with separate tubes 30B.

According to the optical fiber cable 1B of the second embodiment, at least the subunits 20A to 20D located at the outer peripheral part of the slot groove 3 are covered with the thin-skin-shaped tube 30B. Therefore, the subunits 20A to 20D housed at the outer peripheral part of the slot groove 3 and the optical fiber ribbons 10 forming the subunits 20A to 20D are not disassembled into pieces and thus do not protrude from the slot groove 3. Since the subunits 20A to 20D covered with the tube 30B are disposed at the outer peripheral part, the subunits 20E to 20G housed inside the slot groove 3 and the optical fiber ribbons 10 forming the subunits 20E to 20G also do not protrude from the slot groove 3. Accordingly, since it is not required to apply the press winding to the outer periphery of the slot groove 3, there is no restriction on the housing space of the slot groove 3 in the same manner as that of the first embodiment, thereby making it possible to provide a multi-coaxial and high-density optical fiber cable.

Hereinabove, while the present disclosure is described in detail and with reference to specific embodiments, it is apparent to those skilled in the art that various changes and modifications can be made without departing from the spirit and scope of the present disclosure. The number, position, and shape of the components described above are not limited to the above-described embodiments, and can be changed to the number, position, and shape suitable for implementing the present disclosure.

REFERENCE SIGNS LIST 1A, 1B: optical fiber cable
2: rib
3: slot groove
4: slot core
5: sheath
7: first layer part
8: second layer part (example of outermost layer portion)
10: optical fiber ribbon
11A to 11L: optical fiber
12: connection part
13: non-connection part
20 (20A to 20G): subunit
30A, 30B: tube
40: water absorbing yarn

The invention claimed is:

1. An optical fiber cable having a slot core which includes a plurality of ribs formed along a cable longitudinal direction and in which slot grooves for housing optical fibers are formed between the ribs, the optical fiber cable comprising:
    subunits each of which is formed by bundling a plurality of intermittent-connection-type optical fiber ribbons in which a connection part where adjacent optical fibers are connected to each other and a non-connection part where adjacent optical fibers are not connected to each other are intermittently provided in the longitudinal direction among some or all of optical fibers; and
    a thin-skin-shaped tube having Young's modulus lower than Young's modulus of a material forming the slot core, wherein
    the subunits are housed in the slot grooves, and
    among the subunits in the slot grooves, at least a subunit located at an outer peripheral part of the slot grooves is covered with the tube.

2. The optical fiber cable according to claim 1, wherein the number of cores of the optical fibers housed in one of the slot grooves is equal to or greater than 288 cores.

3. The optical fiber cable according to claim 1, wherein when a length of a root part of the rib, which is defined by a line connecting bottom parts of the slot grooves, is defined as t and a distance of a straight line connecting the root part and an apex of the rib is defined as a rib height h, h/t is equal to or greater than 4 and equal to or less than 8.

4. The optical fiber cable according to claim 1, wherein at least an outermost layer portion of the slot core is formed of engineering plastic.

5. The optical fiber cable according to claim 1, wherein a water absorbing yarn is provided in the tube.

6. The optical fiber cable according to claim 1, wherein core density of optical fibers housed in the optical fiber cable is equal to or greater than 5.0 cores/mm$^2$.

* * * * *